US010313731B1

(12) United States Patent
Krishnan et al.

(10) Patent No.: US 10,313,731 B1
(45) Date of Patent: Jun. 4, 2019

(54) ROAMING VIDEO SESSION WITH RADIO FREQUENCY REMOTE CONTROL

(71) Applicant: Cox Communications, Inc., Atlanta, GA (US)

(72) Inventors: Ramkumar Krishnan, Marietta, GA (US); Muhammad Raza, Norcross, GA (US); Matt Munchinski, Cumming, GA (US); Albert Higashi, Lawrenceville, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 0 days.

(21) Appl. No.: 15/581,854

(22) Filed: Apr. 28, 2017

(51) Int. Cl.
*H04N 21/422* (2011.01)
*H04N 21/436* (2011.01)
*H04N 21/442* (2011.01)
*H04N 21/45* (2011.01)

(52) U.S. Cl.
CPC ..... *H04N 21/42221* (2013.01); *H04N 21/436* (2013.01); *H04N 21/442* (2013.01); *H04N 21/4532* (2013.01)

(58) Field of Classification Search
CPC ........... H04N 21/42221; H04N 21/436; H04N 21/442; H04N 21/4532
See application file for complete search history.

(56) References Cited

U.S. PATENT DOCUMENTS

| | | | |
|---|---|---|---|
| 2005/0097618 A1* | 5/2005 | Arling | H04L 12/2805 725/114 |
| 2005/0289597 A1* | 12/2005 | Kawahara | G11B 27/034 725/52 |
| 2012/0047539 A1* | 2/2012 | Hao | H04N 21/2747 725/82 |
| 2015/0185752 A1* | 7/2015 | Bard | G05F 1/66 700/296 |
| 2015/0195595 A1* | 7/2015 | Choi | H04N 7/163 725/12 |
| 2016/0191989 A1* | 6/2016 | Hardt | H04N 21/43615 725/25 |

* cited by examiner

*Primary Examiner* — Oschta I Montoya
(74) *Attorney, Agent, or Firm* — Merchant & Gould

(57) ABSTRACT

A roaming video experience, in which users continue watching a content item when moving from viewing device to viewing device is enabled herein via Radio Frequency (RF) enabled remote controls and set top boxes. A device identifier from a first RF-enabled set top box is communicated to an active RF-enabled remote control. When a user signals a second RF-enabled set top box, the viewing session parameter set associated with the active RF-enabled remote control is passed to the second RF-enabled set top box. Using the parameter set, the second set top box is enabled to learn the system settings, user preferences, and content item that were used on the first set top box, and provide a continued viewing experience—the roaming video experience—for the user on an associated viewing device.

20 Claims, 5 Drawing Sheets

ROAMING VIDEO SESSION WITH RADIO FREQUENCY REMOTE CONTROL

BACKGROUND

Consumers of television services greatly enjoy being able to customize their viewing experience with viewer profiles. These profiles, however, are bound to Set Top Boxes (STBs), such that a viewer must reactivate a profile whenever a viewing experience shifts between STBs, thus leading to viewer frustration and having to recalibrate viewing sessions or reselect profiles when shifting between viewing devices.

SUMMARY

Aspects of the present disclosure provide for systems and methods to provide consumers and service providers with a roaming video session with a Radio Frequency (RF) remote control. An RF remote control stores a device identifier and communicates that identifier with various STBs (Set Top Boxes) as the user interacts, via the RF remote control, to view content. An STB receives the device identifier in addition to commands from the RF remote, and analyzes whether an ongoing viewing session is in progress, a distance to the RF remote, parental settings, etc., to determine whether to implement a viewing session parameter set associated with the device identifier on the associated viewing device. The viewing session parameter set may be associated or mapped to the device identifier of a particular RF remote control locally within a household (i.e., on the collective STBs) or in the cloud (e.g., at the headend of a service provider). In response to determining to implement the parameter set, the STB will set the content, viewing preferences, control preferences, etc., to those dictated by the parameter set so that the user may continue viewing the content as left off.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout the several views.

DETAILED DESCRIPTION

As briefly described above, aspects of the present disclosure provide consumers and service providers with a roaming video session with a Radio Frequency (RF) remote control. An RF remote control stores a device identifier and communicates that identifier with various STBs (Set Top Boxes) as the user interacts, via the RF remote control, to view content. An STB receives the device identifier in addition to commands from the RF remote, and analyzes whether an ongoing viewing session is in progress, a distance to the RF remote, parental settings, etc., to determine whether to implement a viewing session parameter set associated with the device identifier on the associated viewing device. The viewing session parameter set may be associated or mapped to the device identifier of a particular RF remote control locally within a household (i.e., on the collective STBs) or in the cloud (e.g., at the headend of a service provider). In response to determining to implement the parameter set, the STB will set the content, viewing preferences, control preferences, etc., to those dictated by the parameter set so that the user may continue viewing the content as left off.

Figure 1:
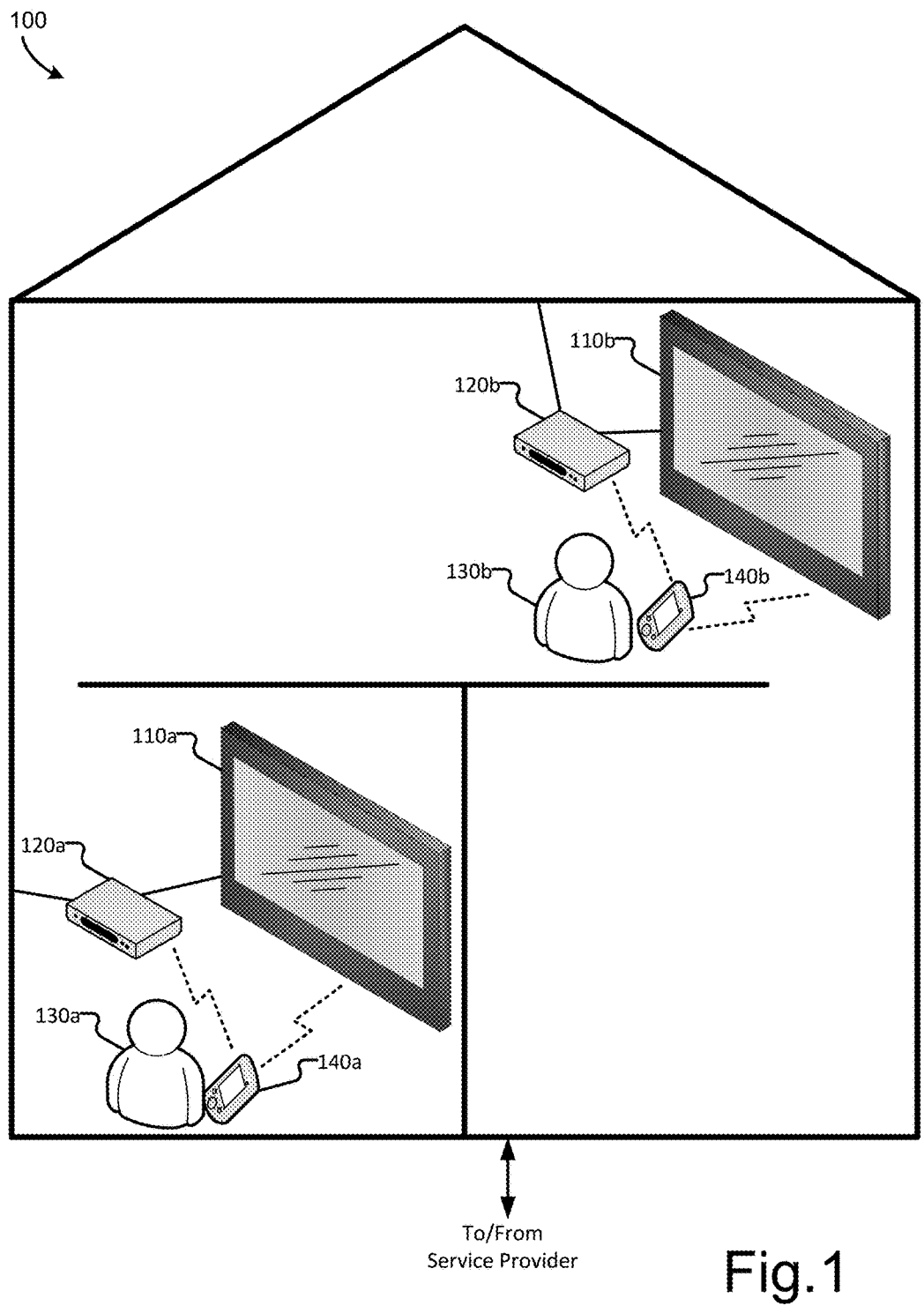
FIG. 1 illustrates an example household in which the present disclosure may be practiced.

FIG. 1 illustrates an example household 100 in which the present disclosure may be practiced. Although described primarily in terms of a single-family residential dwelling, one of ordinary skill in the art will appreciate that the present disclosure is equally applicable to multi-family residential dwellings (e.g., apartments, dormitories, duplexes) as well as commercial environments (e.g., bars, airports, offices) in which television services are made available. The household 100 includes various wiring (e.g., coaxial wiring) that carry signals to and from a service provider to provide various services (e.g., telephone, television, internet) to devices within the household 100 and between devices within the household 100.

Within the household 100, several viewing devices 110 (e.g., televisions, projectors, computers) are illustrated, each associated with an STB 120, that receive content from a television service provider for viewing content items on the associated viewing device 110. Service providers include terrestrial broadcasters and cable television service providers as well as satellite television providers. The users 130 in the household 100 communicate wirelessly with the STBs 120 and viewing devices 110 via remote controls 140 (in addition to built-in or attached buttons on the viewing devices 110 and STBs 120) to establish or modify a viewing experience.

The household 100 is in communication with at least one service provider, who manages and provisions content to the household 100 via various formats and communications media (e.g., radio waves through air/vacuum, beams of light via fiber optic cables, electrical waves via copper wires). The facilities of the service provider (e.g., a head end) used to manage and provision content are used, in some aspects, to store associations between viewing sessions and the device identifiers of various RF remote controls 140. In other aspects, the associations between viewing sessions and the device identifiers of various RF remote controls 140 are stored locally within the household 100 on one or more STBs 120 (e.g., on a master STB 120 or distributed on each STB 120 in the household 100).

Although two each of the viewing devices 110, STBs 120, users 130, and remote controls 140 are illustrated in FIG. 1, one of ordinary skill in the art will appreciate that more or fewer of each may be present in various aspects. For the present disclosure to differentiate various elements of a shared type from one another in the examples given herein, a letter designator will be applied to the general part numbers, such that a first element will be given a designator of "a", a second element a designator of "b", a third element a designator of "c", etc. For example, a third user 130c may watch content on a second viewing device 110b in a first household 100a using a fourth remote control 140d.

Figure 2:
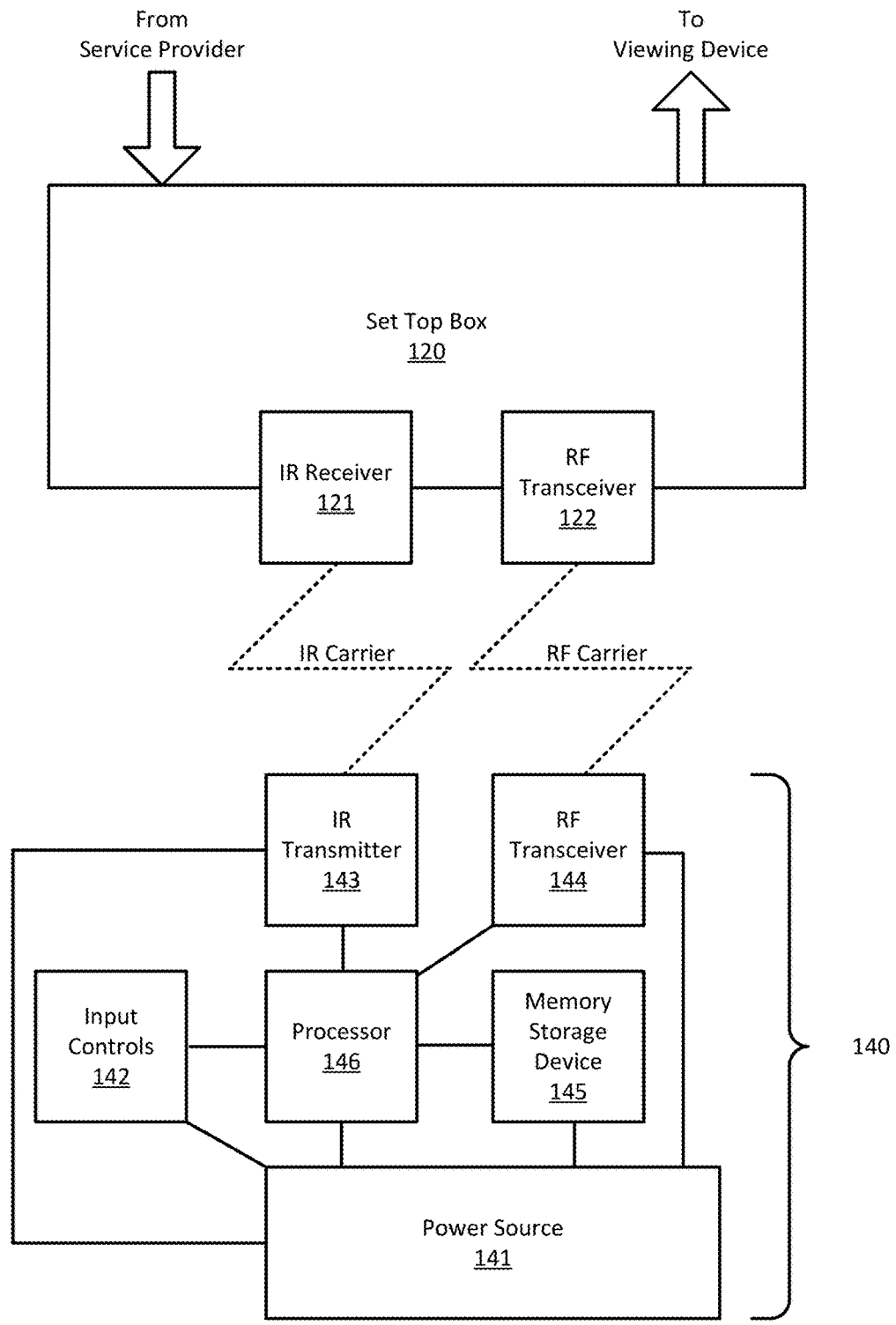
FIG. 2 illustrates various details of an example RF-enabled STB and example RF-enabled remote control.

Turning now to FIG. 2, various details of an example RF-enabled STB 120 and example RF-enabled remote control 140 are illustrated. The STBs 120 include various hardware to communicate with the associated viewing device 110, remote controls 140, and the service providers. Some of these hardware elements that enable the operation and logic of the STB 120 are discussed in greater detail in regard to FIG. 5, but are omitted from FIG. 2 so as not to distract from the disclosure. Of particular note are an Infrared (IR) receiver 121 (e.g., one or more Infrared Receiver Diodes), and a radio frequency (RF) transceiver 122 (e.g., one or more antennas tuned to RF and used for reception and/or transmission). The IR receiver 121 enables the STB 120 to receive messages encoded on IR beams, and the RF transceiver 122 enables the STB 120 to send and receive messages encoded on RF waves. Depending on the protocol used, the messages sent and received may be encoded in a variety of ways and with various headers, footers, checksums, etc., with which one of ordinary skill in the art will be familiar.

In various aspects, the STB 120 includes Digital Video Recorder (DVR) functionality to record and playback linear content received by the STB 120 or shared from another STB 120 in the household 100 (e.g., via the Multimedia Over Coax (MOCA®) standard available from the Multimedia Over Coax Alliance of San Ramon, Calif.). Content received by the STB 120 includes linear content items received from a television service provider (e.g., television shows playing on television networks supplied to the household 100), non-linear content received from a service provider (e.g., Video On-Demand content offered by a television service provider, online videos delivered from a video service provider such as, for example Netflix, Inc. of Los Gatos, Calif. or Amazon.com, Inc. of Seattle, Wash.), and non-linear content received from a user-controlled repository (e.g., a cloud-based DVR, content stored on the STB 120, content stored on another STB 120 in the household 100). Non-linear content further includes menus or other interfaces provided in addition to content items provided in the user experience, such as, for example, search results, lists of applications, channel guides, Video On Demand catalogs, content item detail reports (e.g., cast details, plot synopses), etc.

Each remote control 140 includes a power source 141 (e.g., batteries) to power the components of the remote control 140, input controls 142, an IR transmitter 143 (e.g., one or more Infrared Emitter Diodes), an RF transceiver 144 (e.g., one or more antennas tuned to a particular frequency range and used for reception and/or transmission), a memory storage device 145, and a processor 146. The input controls 142 enable users 130 to input commands to the remote control 140 by providing one or a series of inputs (e.g., touch, voice, biometric markers). In various aspects, the input controls 142 include biometric sensors, touch-enabled screens, microphones (with associated voice command software provided from the memory storage device 145), switches, and push buttons. The commands received from the input controls 142 are interpreted by the processor 146 (based on instructions embodied in the memory storage device 145, as hardwired into an Application-Specific Integrated Circuit (ASIC) as the processor 146, or "flashed" into a Field-Programmable Gate Array (FPGA) as the processor 146), and are encoded onto a transmission medium (e.g., an IR carrier wave or an RF carrier wave) via one or more of the IR transmitter 143 or RF transceiver 144 for communication to an STB 120. Similarly, RF signals received by the RF transceiver 144 are interpreted by the processor 146 and, depending on the signal, may affect instructions or other data held in the memory storage device 145, such as, for example, navigational cache values (e.g., for a last viewed channel command). Depending on the protocol used, the messages sent and received may be encoded in a variety of ways and with various headers, footers, checksums, etc., with which one of ordinary skill in the art will be familiar. In various aspects, remote controls 140 include controllers designed for specific STBs 120 or viewing devices 110, "universal" controllers programmable for use with a variety of devices, as well as secondary screen devices, such as, for example, smart phones, laptops, tablets, and personal digital assistants configured for use as a remote control 140 via various applications.

The RF transceivers 144 of the remote control 140 and the RF transceivers 122 of the STB 120 enable the consumers 130 to communicate content choices and commands without the direct line of sight (LOS) requirements imposed by IR communication standards. Examples of RF communication standards include, but are not limited to the ZIGBEE® and BLUETOOTH® Radio Frequency for Consumer Electronics (RF4CE) standards (provided by the ZigBee Alliance Corp. of San Ramon, Calif. and Bluetooth Sig. Inc. of Kirkland, Wash., respectively). In various aspects, one or more of the STB 120 and the remote control 140 may omit the IR components (e.g., the IR receiver 121 or IR transmitter 143).

To ensure proper communications between remote controls 140 and STBs 120, each STB 120 performs various calculations based on the signal strength and/or timing delays between signals transmitted between the remote controls 140 and STBs 120 to determine whether a given remote control 140 is to be interpreted as communicating with a given STB 120. For example, in the illustrated household 100 of FIG. 1, user 130a may be viewing linear content (e.g., television stations) in a first room on viewing device 110a using remote control 140a and STB 120a to communicate channel changes, volume changes, menu selections, etc. At the same time, user 130b views non-linear content (e.g., On-Demand selections, pre-recorded content) on viewing device 110b using remote control 140b and STB 120b to communicate channel changes, volume changes, menu selections, etc. To prevent user 130a (via remote 140a) from changing the channel, volume, or settings of STB 120b or viewing device 110b (and similarly preventing user 130b from affecting user 130a's viewing experience), each STB 120 may set a threshold for signal strength and/or calculated distance for accepting commands from a given remote control 140.

In some aspects, a closest active remote control 140 is set as the corresponding remote control 140 for a given STB 120. In other aspects, an active remote control 140 with a highest signal strength is set as the corresponding remote control 140 for a given STB 120. In yet other aspects, a time period/delay from the last signal received from a first remote control 140a may prevent a second remote control 140b from affecting an associated first STB 120a and/or first viewing device 110a or limiting the second remote control 140b to a subset of available actions (e.g., volume up/down and power on/off, but not channel changing or menu navigation). In a further aspect, a table of known remote controls 140 is maintained in each STB 120 or at the service provider's systems so that even if an unknown or unregistered remote control 140 (e.g., associated with a neighbor) were to have a lower transmission delay or higher signal strength, its signals would be ignored. In some aspects, when multiple remote controls 140 may potentially be associated with one STB 120, the STB 120 will look up which whether the remote control 140 which sent the last signal is listed as being currently associated with a viewing experience on the STB 120 before accepting its commands. Additionally or alternatively, when multiple remote controls 140 may potentially be associated with one STB 120, the STB 120 will use IR signals to verify one of the multiple remote controls 140 as the active remote control 140 from which to accept signals.

The device identifiers communicated between the STBs 120 and the remote controls 140 and associated with the parameters of the viewing experiences on the STBs 120 may also be associated with system defined user profiles used by the service provider to provide different viewing experiences to specific users 130 as well as listings of data needed to provide a roaming viewing experience. For example, aspects of the parameter sets associated with the device identifiers include one or more of: a user identifier, a content item identifier, a content type identifier (e.g., linear, non-linear), a content retrieval identifier (e.g., channel, file path), a temporal identifier (i.e., when in a content item to provide playback from), settings data (e.g., color settings, parental controls, volume level, closed captioning activation), user preferences (e.g., favorite channels, blocked/skipped channels), account identifiers (e.g., for enabling On-Demand options, charging premium items), and identifier/parameter set pair aging parameters.

Figure 3:
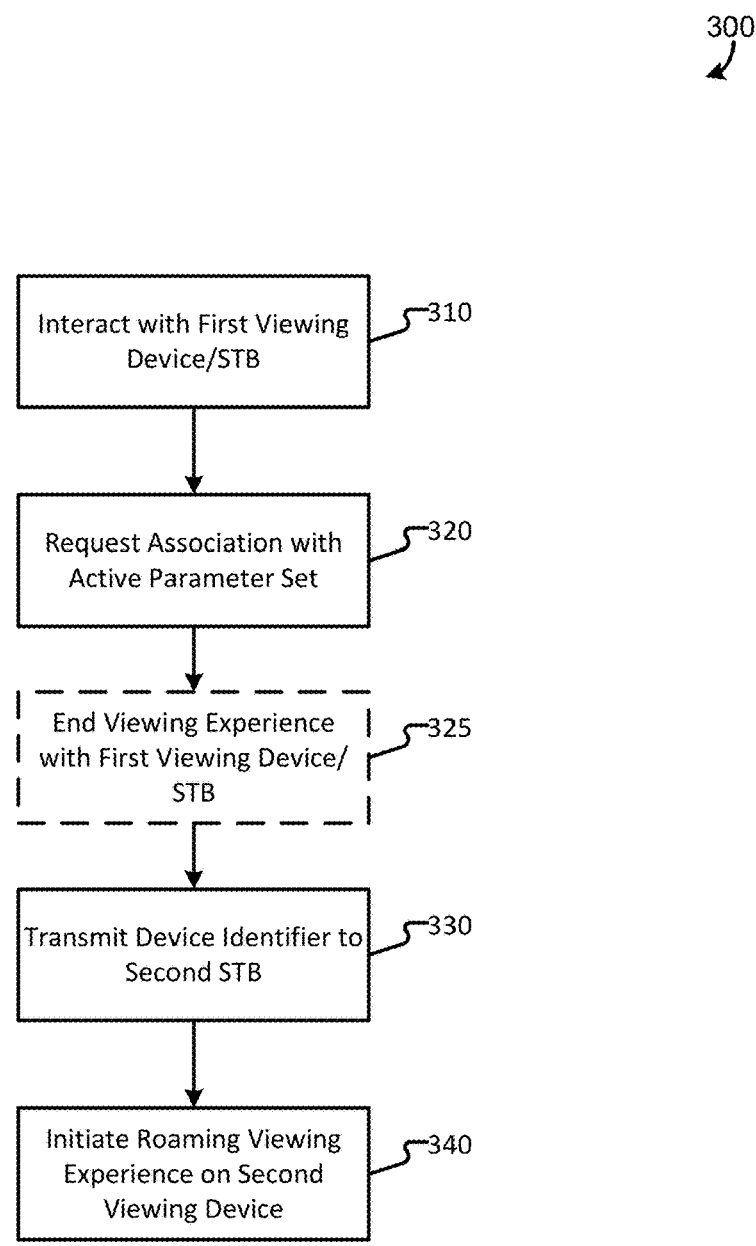
FIG. 3 is a flowchart illustrating general stages in an example method for providing a roaming video session via RF-enabled remote controls and STBs from the perspective of the remote control.

FIG. 3 is a flowchart illustrating general stages in an example method 300 for providing a roaming video session via RF-enabled remote controls 140 and STBs 120 from the perspective of the remote control 140. Method 300 begins with OPERATION 310, where a user 130a uses a remote control 140a to interact with a first viewing device 110a via a first STB 120a. For example, the user 130a may desire to turn on/off a television, tune to a channel of linear content, request non-linear content playback, perform trick play operations (e.g., pause, rewind, fast forward, content jumps, slow/fast motion), change a volume or other setting, navigate a menu, etc., and will therefore manipulate various input controls 142 on the remote control 140a.

Figure 4:
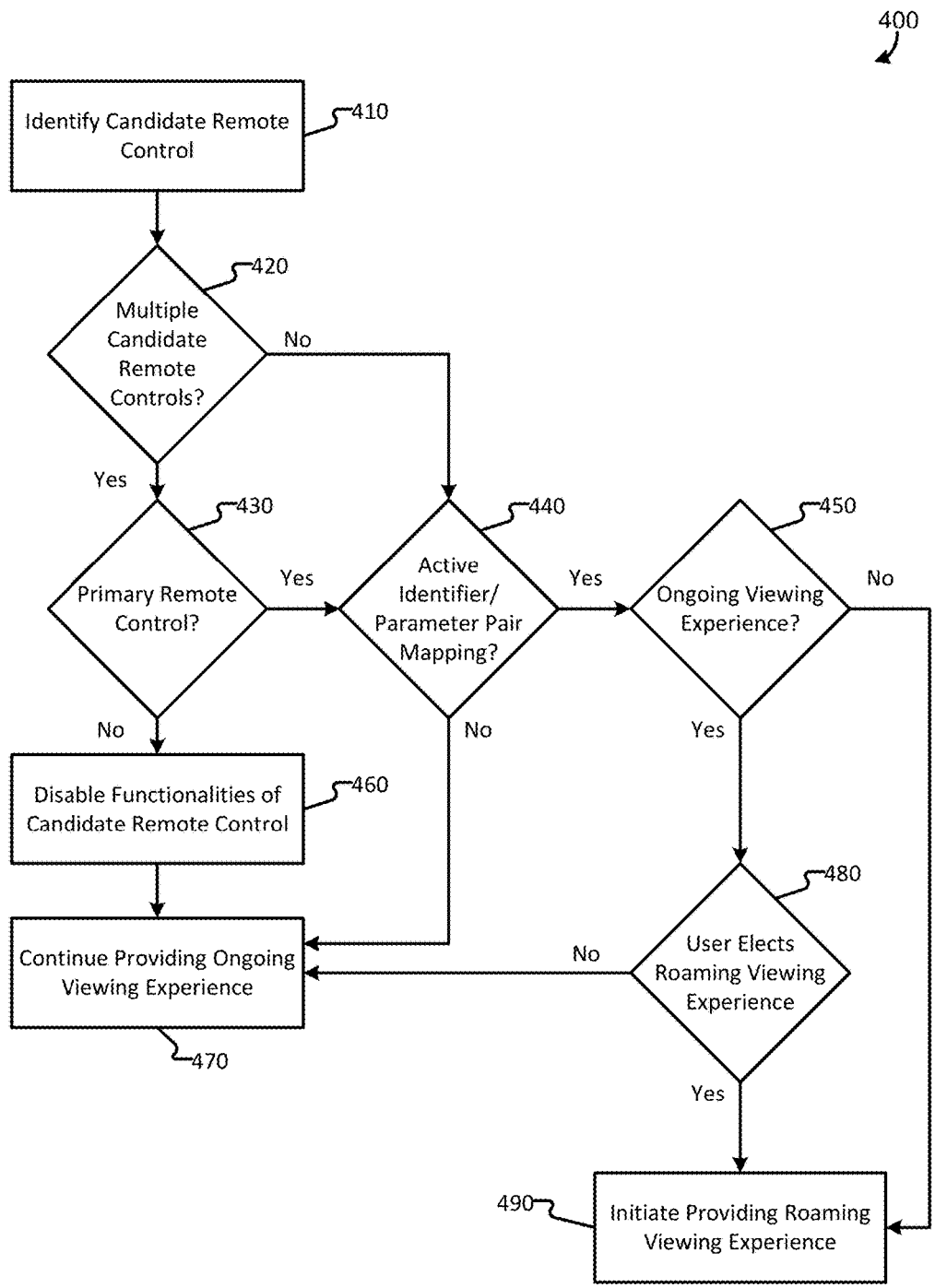
FIG. 4 is a flowchart illustrating general stages in an example method for providing a roaming video session via RF-enabled remote controls and STBs from the perspective of the STBs in the household.

The STB 120a will determine whether to accept the commands from the remote control 140a and whether a given parameter set is to be associated with the device identifier of the particular remote control 140, which is discussed in greater detail in regard to method 400 of FIG. 4.

Proceeding to OPERATION 320, the remote control 140a transmits, to the STB 120a, a request to have its identifier associated with the parameter set that is active in viewing the content on the viewing device 110a. In various aspects, the association is made to an active viewing experience's parameter set is manually selected by the user 130a when initiating a content viewing experience (or at some time later in the experience), automatically chosen by the STB 120a based on viewing patterns (including time of day, content being view, STB 120a delivering the content, etc.), or automatically suggested by the STB 120a to the user 130a for selection based on viewing patterns. The remote control 140a may request association with the current parameter set in conjunction with any command transmitted to the STB 120a or viewing device 110a, in conjunction with a subset of commands (e.g., only channel changing commands, not volume changing commands, a specific associate identifier command).

In various aspects, the parameter set identifies at least one of: the system settings (e.g., color balance, volume level, parental controls, closed captioning settings), user preferences (e.g., favorite channels, blocked/skipped channels), account identifiers (e.g., for enabling On-Demand options, charging premium items), an active user profile, and information about the current content item being viewed (e.g., title, channel/file location, temporal position in the content item), time of provision to the remote control 140a (e.g., for aging-out purposes), etc.

Optionally, at OPTIONAL OPERATION 325, the user 130a, via the remote control 140a, ends the viewing experience on the first viewing device 110a by signaling the first STB 120a and/or the first viewing device 110a to turn off or to allow a second user 130b with another remote control 140b (associated with a different parameter set) to use the first viewing device 110a. In aspects in which OPTIONAL OPERATION 325 is included, the remote control 140a may transmit a final association request to set a final set of values in the parameter set to map to the device identifier or content bookmark in the associated parameter set, which is stored in a memory storage device associated with the service provider or one or more STBs 120 in the household 100. In aspects in which OPTIONAL OPERATION 325 is omitted (i.e., where the viewing experience continues on the first viewing device 110a, but the remote control 140 is brought into communication with a second STB 120b and viewing device 110b), the memory storage device may be cleared of the association to the device identifier when the remote control 140a comes into communication with a second STB 120b, thus concluding method 300, or may retain the association to establish a second instance of the ongoing viewing experience on the new viewing device 110b. For example, a parent may, using one remote control 140a, establish a first viewing experience for a child in one room on a first viewing device 110a, and then establish a second viewing experience (for the parent) in a second room on a second viewing device 110b. Depending on system or user preferences, the second viewing experience may initiate with the same content item and settings as the first viewing experience (i.e., as part of a roaming video session) or may initiate with a last-known group of settings and content selections from an associated STB 110b or a default initiation settings and content selections (i.e., not part of a roaming video session).

At OPERATION 330 the user 130a uses the remote control 140a to transmit a signal including the device identifier to a second STB 120b with a second associated viewing device 110b. In various aspects, the signal transmitted is a "power on" command that includes the stored device identifier from the remote control 140a. In other aspects, a "take command" signal is transmitted from the remote control 140a to an already powered on STB 120b and/or viewing device 110b, wherein the "take command" signal includes the device identifier to the STB 120b and/or viewing device 110b to implement the roaming viewing experience. In various aspects, the signal is interpreted by the STB 120b to determine whether to initiate the roaming viewing experience. For example, the ongoing viewing experience of another user 130b may be given priority over the viewing experience of the requesting user 130a, or the STB 120b may request confirmation via a pop-up dialog to initiate the roaming video experience for the requesting user 130a.

Method 300 concludes with OPERATION 340, where the viewing experience from the first STB 120a and associated viewing device 110a is initiated (via the second STB 120b) on the second viewing device 110b. In some aspects the user 130a initiates the roaming viewing experience with the signal transmitted in OPERATION 330, while in other aspects, the user 130a confirms a pop-up dialog displayed on the second viewing device 110b to confirm initiation of the roaming viewing experience. The user 130a is thus provided the content that was being viewed on the first viewing device 110a on the second viewing device 110b at a last-viewed time (according to the parameter set associated with the device identifier) without having to navigate a series of menus, manipulate trick play options, or navigate channels.

In various aspects, the parameter set includes a configurable time offset (e.g., a user or system defined period of up to s seconds or f frames) so that playback resumes on the second viewing device 110b s seconds or f frames before or after the parameter set otherwise indicates, to account for transmission delays of the association requests from the remote control 140 and forming the association with the current content item, to provide context in resuming playback (e.g., resuming playback on an I-frame rather than a P-frame or B-frame, giving a user 130 a short recap of the content item). In additional aspects, the configurable time offset may either increment as time progresses or stay constant, for example to keep roaming viewing experience synced with a "live" or ongoing transmission or to lock the roaming viewing experience to a bookmark or timestamp in the content item. In further aspects, the parameter set includes additional navigational information related to the viewing experience, such as, for example, a last viewed channel or content item for operation in conjunction with a "back" control input 142 or information related to Picture-in-Picture (PiP) channels/content items, and related time offsets for those channel or content items. In various aspects, some or all of the parameter set may be transmitted to the remote control 140 for storage in its memory storage device 146 for operation of various commands (e.g., updating a last-view channel cache for a "back" control input 142).

FIG. 4 is a flowchart illustrating general stages in an example method 400 for providing a roaming video session via RF-enabled remote controls 140 and STBs 120 from the perspective of the STBs 120 in the household 100. Method 400 begins with OPERATION 410, where a remote control 140a is detected as a candidate active remote control 140 by a given STB 120a in the household 100. The candidate remote controls 140 are those remote controls 140 that have been identified previously (e.g., during a service setup) by the service provider's or local STB's controller as paired with one or more STBs 120 in the household 100 so that the identifiers of those remote controls 140 can be mapped with various parameter sets of viewing experiences for roaming within the household 100. In various aspects, the STB 120a identifies a given remote control 140a as a candidate active remote control 140 based on one or more of: a signal strength of RF signals satisfying a threshold amplitude, a time delay for RF signals from the given remote control 140a satisfying a time threshold, receiving IR signals from the given remote control 140a in addition to RF signals, or an identifier associated with the given remote control 140a belonging to a table of known remote controls 140 for the household 100. The given remote control 140a is identified as a candidate in response to the remote control 140a transmitting a command to the STB 120a. For example, a user 130 transporting a remote control 140 from one room to another that comes within range of an STB 120 will not be identified as a candidate remote control 140 if the user 130 does not cause the remote control 140 to transmit any commands to the STB 120.

At DECISION 420, the STB 120a determines whether the identified remote control 140a is the only candidate remote control 140 or if multiple remote controls 140 have been identified as candidates. If only one remote control 140 has been identified, method 400 proceeds to DECISION 440. If multiple remote controls 140 have been identified, method 400 proceeds to DECISION 430.

At DECISION 430, the STB 120a determines which of the multiple remote controls 140 is to be treated as the primary active remote control 140. For example, if two remote controls 140 are candidate active remote controls 140, a first remote control 140a may be selected as the primary active remote control 140 based on having a greater signal strength or shorter time delay (either condition being indicative of the first remote control 140a located closer to the STB 120a than a second remote control 140b). In another aspect, a second candidate remote control 140b (located further away than a first remote control 140a relative to the STB 120a) is selected as the primary active remote control 140 due to a time of last interaction of the first remote control 140a or the second remote control 140b. For example, two remote controls may be equidistant from the STB 120a, but neither has transmitted a command to the STB 120a in the last s seconds, and therefore the remote control 140 that first sends a signal to the STB 120a will be selected as the primary active remote control 140 from the two candidates. In another example, a first remote control 140a is established as the sole active remote control 140, but a user 130 carries a second remote control 140b into range of the STB 120a. The first remote control 140a may be determined to be the primary active remote control 140 for as long as the current viewing session continues, a user 130 manually switches which remote control 140 is the primary remote control 140, so long as the first remote control 140a remains in range of the STB 120a to be identified as a candidate, or so long as commands are received from the first remote control 140a at least every s seconds. In some aspects, a household 100 may designate certain remote controls 140 to be primary remote controls 140 whenever identified as a candidate by an STB 120, set a hierarchy of remote control primacy among the available remote controls 140, or designate certain remote controls 140 to be secondary remote controls 140 (e.g., non-RF-enabled remote controls 140 are treated as non-primary remote controls 140, parental settings disable particular remote controls 140 from being primary remote controls 140).

In response to determining that a given remote control 140a is not to be treated as the primary remoted control 140 (i.e., it is to be treated as a secondary remote control 140), method 400 proceeds to OPERATION 460, where the STB 120a disables certain functionalities of the given remote control 140a. For example, an STB 120a may ignore a subset of available commands from a secondary remote control 140, ignore a transmitted device identifier, or not request (from local or remote storage mapping device identifiers to viewing experience parameter sets) a parameter set associated with a secondary remote control 140. Method 400 then proceeds to OPERATION 470 to continue providing the active (or default) viewing experience.

At OPERATION 470, the STB 120a continues providing the ongoing viewing experience on the viewing device 110a. In various aspects, the ongoing viewing experience includes a content item that is being played back on the viewing device 110a, a "home" screen or channel, or a currently displayed menu or interface.

In response to determining that a given remote control 140a is to be treated as the primary remoted control 140 (i.e., it is not to be treated as a secondary remote control 140), method 400 proceeds to DECISION 440, where it is determined whether a valid parameter set is associated or mapped to the identifier for the given remote control 140a that has been received by the STB 120 from the given remote control 140a. In some aspects, a mapping or association between a device identifier and parameter set may be "aged out" based on the time at which the mapping was established. For example, a mapping established more than m minutes ago may be automatically deleted from a table (remote or locally stored) of identifier/parameter pairs or considered to be aged out, and thereby no longer valid, by the STB 120. By aging out mappings, a user 130 who uses a remote control 140 on a new STB 120 may avoid unintentionally starting a roaming viewing session based on viewing patterns from more than m minutes ago. As will be appreciated, an aging out threshold of m minutes may be set by the system or configurable by the user 130.

In various aspects, a candidate remote control 140 may independently broadcast a device identifier or include a device identifier in given sets of interaction signals communicated to the STBs 120 (e.g., power on commands, take control commands, confirmation commands, all commands). A given remote control 140, however, may not include a device identifier associated with a viewing experience parameter set or may delay in transmitting that identifier. Until the STB 120a receives the device identifier or forms an association between the device identifier and viewing experience parameters, method 400 will proceed to OPERATION 470 to continue providing the active (or default) viewing experience.

In response to receiving a device identifier associated with a parameter set for a viewing experience, method 400 proceeds to DECISION 450, where it is determined whether an ongoing viewing experience is being provided on the viewing device 110a associated with the STB 120a. In response to determining that an ongoing viewing experience is not being provided by the viewing device 110a and STB 120a, such as, for example, when the viewing device 110a was powered off or in a menu interface prior to identifying the remote control 140a, method 400 proceeds to OPERATION 490 to initiate providing a roaming viewing experience according to the parameter set associated with the device identifier. In response to determining that an ongoing viewing experience is being provided by the viewing device 110a and STB 120a, such as, for example, when the viewing device 110a is powered on and playing back a content item, method 400 proceeds to DECISION 480.

Depending on system preferences and the command received from the remote control 140a, the STB 120a at DECISION 480 may automatically determine that the user 130 has elected to replace the ongoing viewing experience with a roaming viewing experience provided from another STB 120b or may display a confirmation message on the viewing device 110a to receive a user selection as to whether the user 130 is electing to view the currently displayed content or initiate a roaming viewing experience on the current pair of viewing device 110a and STB 120a. For example, a "channel up" command may result in the STB 120a displaying a confirmation message on the viewing device 110a to receive the user's selection, whereas a "take control" command results in the STB 120a initiating the roaming viewing experience in accord with the parameter set associated with the device identifier of the remote control 140a and method 400 proceeds to OPERATION 490. If the user 130 accepts the roaming viewing experience by selecting an input control 142 associated with acceptance (e.g., an "ok" or "yes" button) on the remote control 140a, method 400 will proceed to OPERATION 490 where the STB 120a will initiate the viewing experience indicated by the device identifier. If the user 130 rejects the roaming video experience by selecting an input control 142 associated with rejection (e.g., a "cancel" or "no" button) on the remote control 140a or letting the pop-up time out, method 400 will proceed to OPERATION 470 where the STB 120a continues to provide the ongoing viewing experience.

At OPERATION 490, the STB 120a interprets the device identifier to recall the values of the parameter set associated with the remote control 140a and to then initiate providing the roaming viewing experience for the user 130. The parameter set includes, in various aspects, identifiers for the type of content being viewed via a previous STB 120b and associated viewing device 110b at which the device identifier was originally associated (e.g., linear, service provider-provided non-linear, user-provided non-linear), identifiers for content item locations (e.g., a channel, a service provider ID, a file path), temporal identifiers within the content item (e.g., a bookmark, a timestamp, a "live" marker), secondary content identifiers (e.g., locations and temporal identifiers for PiP and/or a "last viewed" content item), and user preferences or system settings. The STB 120a interprets these data present in the parameter set to request the content item (e.g., from the service provider or storage device) according to the temporal identifiers for playback to the user 130.

Depending on the user preferences, playback of the indicated content item may resume on viewing device 110a from the temporal location in the content item last seen on viewing device 110b (e.g., as if the user 130 had paused playback on one device and resumed playback on a second device) or from a running current time (e.g., as if the user 130 left playback running on one device and a second device is synced to the first's ongoing playback). Additionally, depending on system or user-defined settings, playback may be adjusted or offset by s seconds or f frames to provide a recap of the content item or begin playback from a prior I-frame or to begin playback from the next I-frame.

Method 400 may conclude after OPERATION 470 or OPERATION 490, or may repeat from OPERATION 410 in response to detecting an interaction from a new remote control 140. In some aspects, the STB 120a will transmit an update to the parameter set mapped to the device identifier of the remote control 140a or establish a new identifier/parameter set pair mapper for the remote control 140a as part of OPERATION 470 or OPERATION 490 so that if the user 130 attempts to communication with a different STB 120b with the remote control 140a, the content item currently being viewed via the STB 120a (and the associated system settings) will be used for the roaming viewing experience on the different STB 120b. In various aspects, the updated/new mapping is transmitted in response to a "power off" command or a "copy viewing experience" command received from the remote control 140, or transmitted in response to a time cycle occurring (e.g., every s seconds the STB 120a maps an update or new parameter set to the device identifier).

Figure 5:
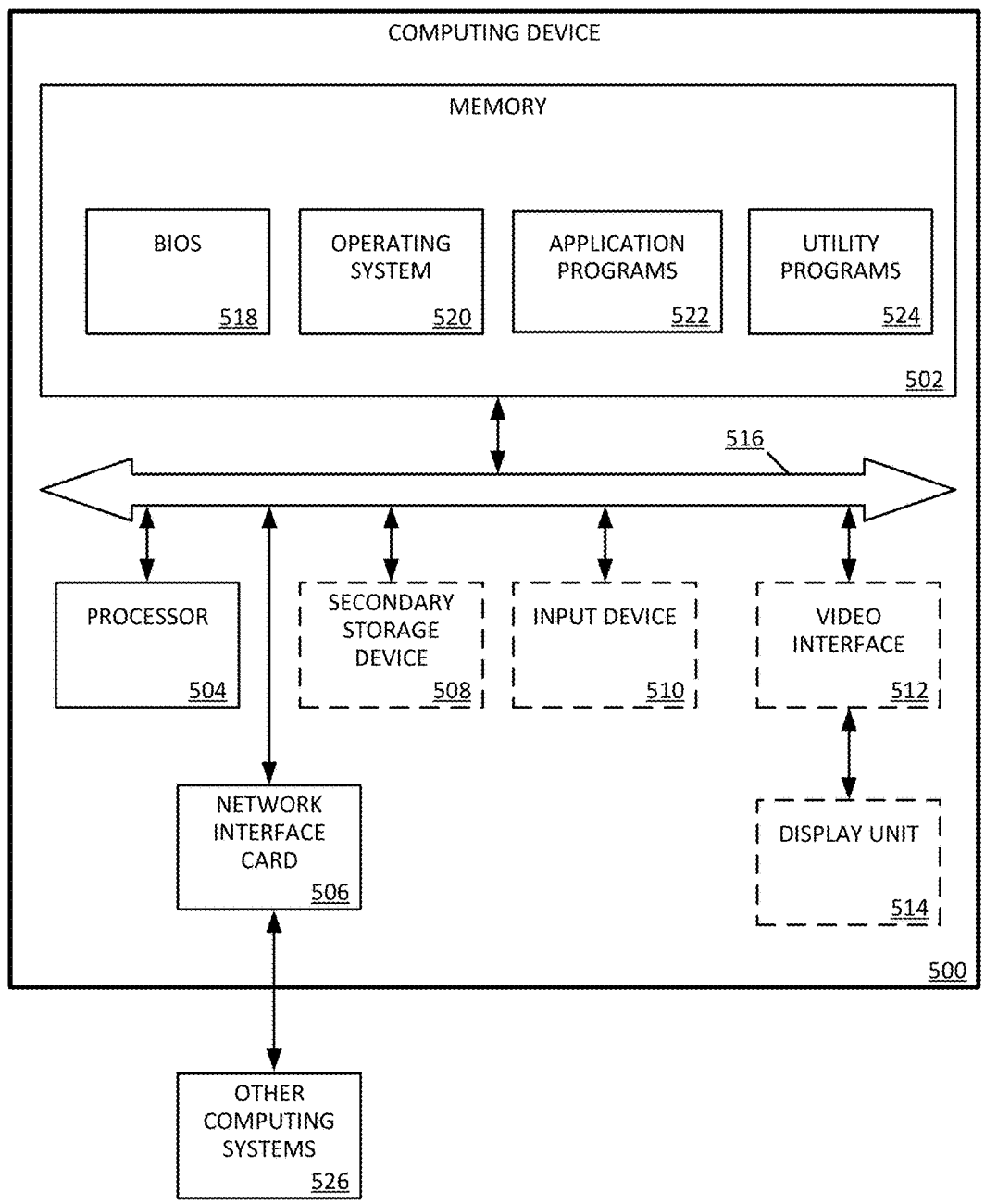
FIG. 5 is a block diagram illustrating example physical components of a computing device with which embodiments of the present disclosure may be practiced.

FIG. 5 is a block diagram illustrating example physical components of a computing device 500 with which embodiments of the present disclosure may be practiced. In some embodiments, one or a combination of the components of the viewing devices 110, STBs 120, and remote controls 140 are implemented using one or more computing devices like the computing device 500. It should be appreciated that in other embodiments, one or a combination of the components of the viewing devices 110, STBs 120, and remote controls 140 may be implemented using computing devices having hardware components other than or in addition to those illustrated in the example of FIG. 5.

Computing devices may be implemented in different ways in different embodiments. For instance, in the example of FIG. 5, the computing device includes a memory 502, a processor 504, a network interface 506, an optional secondary storage device 508, an input device 510, a video interface 512, communicated with a display unit 514, and a communications medium 516. In other embodiments, the computing device 500 may be implemented using more or fewer hardware components or in combination with other types of computer systems and program modules.

The memory 502 includes one or more computer-readable storage media capable of storing data or computer-executable instructions that, when executed by processor 504, provide functionalities as described herein. In various embodiments, the memory 502 is implemented in various ways. For example, the memory 502 can be implemented as various types of computer-readable storage media, which are articles of manufacture used to store various types of data or software instructions. For instance, in the example of FIG. 5, the memory 502 stores a Basic Input/Output System (BIOS) 518 and an operating system 520. The BIOS 518 includes a set of software instructions that, when executed by the processor 504, cause the computing device 500 to boot up. The operating system 520 includes a set of software instructions that, when executed by the processor 504, cause the computing device 500 to provide an operating system that coordinates the activities and sharing of resources of the computing device 500. The memory 502 also stores one or more application programs 522 that, when executed by the processing system 504, cause the computing device 500 to provide applications to users. The memory 502 also stores one or more utility programs 524 that, when executed by the processor 504, cause the computing device 500 to provide utilities to other software programs.

The optional secondary storage device 508 includes one or more computer-readable storage media, and may store data and computer-executable instructions not directly accessible by the processor 504. That is, the processor 504 performs an I/O operation to retrieve data or computer-executable instructions from the secondary storage device 508. In various embodiments, the secondary storage device 508 can be implemented as various types of computer-readable storage media, such as by one or more magnetic disks, magnetic tape drives, CD-ROM discs, DVD-ROM discs, BLU-RAY discs, solid state memory devices, or other types of computer-readable storage media.

Memory storage devices are articles of manufacture that include computer-readable storage media. The term computer-readable storage media does not include transmission media, but refers to hardware devices and media used to store desired information for access by a computer. Examples of computer-readable storage media include, but are not limited to, RAM, ROM, EPROM, EEPROM, solid state memory, such as flash memory, optical storage, such as CD-ROMs and DVDs, and magnetic storage devices, such as magnetic tape and magnetic disks.

The processor 504 includes one or more processing units, which may include tangible integrated circuits that selectively execute computer-executable instructions. In various embodiments, the processing units in the processor 504 are implemented in various ways. For example, the processing units can be implemented as one or more processing cores. In another example, the processor 504 can comprise one or more separate microprocessors. In yet another example, the processor 504 can comprise Application-Specific Integrated Circuits (ASICs) that provide specific functionality. In yet another example, the processor 504 provides specific functionality by using an ASIC and by executing computer-executable instructions.

The computing device 500 may be enabled to send data to, and receive data from, a communication network via a network interface 506. In different embodiments, the network interface 506 is implemented in different ways, such as an Ethernet interface, a token-ring network interface, a fiber optic network interface, a wireless network interface (e.g., Wi-Fi, Wi-Max, etc.), or another type of network interface. The network interface 506 enables the computing device 500 to communicate with other computing systems 526, such as over a wireless network in a distributed computing environment, a satellite link, a cellular link, and comparable mechanisms. Other devices may include computer device(s) 500 that execute communication applications, storage servers, and comparable devices.

The optional input device 510 enables the computing device 500 to receive input from a user. Example types of input devices 510 include, but are not limited to: keyboards, mice, trackballs, stylus input devices, keypads, microphones, joysticks, touch-sensitive display screens, and other types of devices that provide user input to the computing device 500.

The optional video interface 512 outputs video information to an optional display unit 514. In different embodiments, the video interface 512 is implemented in different ways. For example, the video interface 512 may be a video expansion card. In another example, the video interface 512 is integrated into a motherboard of the computing device 500. In various aspects, the display unit 514 can be an LCD display panel, a touch-sensitive display panel, an LED screen, a projector, a cathode-ray tube display, or another type of visual display device. In various embodiments, the video interface 512 communicates with the display unit 514 in various ways. For example, the video interface 512 can communicate with the display unit 514 via a Universal Serial Bus (USB) connector, a VGA connector, a digital visual interface (DVI) connector, an S-Video connector, a High-Definition Multimedia Interface (HDMI) connector, a DisplayPort connector, or another type of connection.

The communications medium 516 facilitates communication among the hardware components of the computing device 500. In different embodiments, the communications medium 516 facilitates communication among different components of the computing device 500. For instance, in the example of FIG. 5, the communications medium 516 facilitates communication among the memory 502, the processor 504, the network interface 506, the secondary storage device 508, the input device 510, and the video interface 512. In different embodiments, the communications medium 516 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computer System Interface (SCSI) interface, or another type of transmission medium.

Embodiments of the present disclosure may be used in various distributed computing environments where tasks are performed by remote processing devices that are linked through a communications network in a distributed computing environment.

Examples and aspects are described above with reference to block diagrams or operational illustrations of methods, systems, and devices. The functions/acts noted in the blocks may occur out of the order as shown in any flowchart or described herein with reference to FIGS. 3 and 4. For example, two processes shown or described in succession may in fact be executed substantially concurrently or the blocks may sometimes be executed in the reverse order, depending upon the functionality/acts involved. Similarly, the component articles of manufacture illustrated in the diagrams of systems and devices described herein may be rearranged, reordered, multiplied, or (depending on the functionalities involved) be implemented by more or fewer components than illustrated.

While certain examples and aspects have been described, other examples and aspects may exist. The foregoing description of the exemplary aspects has been presented for the purposes of illustration and description. It is not intended to be exhaustive or to limit the present disclosure to the precise form disclosed. Many modifications and variations are possible in light of the above teaching. It is intended that the scope of the present disclosure be limited not with this detailed description, but rather by the claims appended hereto.

We claim:

1. A method for providing a roaming viewing experience in conjunction with radio frequency (RF) enabled remote controls and set top boxes (STB), comprising:
   storing a device identifier in a memory storage device of a RF-enabled remote control;
   while a content item provided by a first RF-enabled STB is being viewed on a first viewing device, transmitting the device identifier and a request from the RF-enabled remote control to the first RF-enabled STB to map a parameter set to the device identifier, the parameter set used by the first RF-enabled STB for providing the content item on the first viewing device;
   receiving, from the first RF-enabled STB, the parameter set mapped to the device identifier for storage in the memory storage device; and
   transmitting the device identifier, the parameter set mapped to the device identifier, and an initiation command from the RF-enabled remote control to a second RF-enabled STB associated with a second viewing device, the initiation command instructing the second RF-enabled STB to provide the content item on the second viewing device according to the parameter set mapped to the device identifier.

2. The method of claim 1, wherein the second viewing device is inactive prior to the RF-enabled remote control transmitting the device identifier to the second RF-enabled STB, and wherein the initiation command includes a power on command that includes the device identifier.

3. The method of claim 1, wherein the second RF-enabled STB is providing a second content item on the second viewing device prior to the initiation command being transmitted from the RF-enabled remote control to the second RF-enabled STB, and wherein the initiation command includes a take control command.

4. The method of claim 1, wherein the second RF-enabled STB is providing a second content item on the second viewing device prior to the initiation command being transmitted from the RF-enabled remote control to the second RF-enabled STB, wherein the second RF-enabled STB displays a confirmation pop-up on the second viewing device in response to the RF-enabled remote control transmitting the device identifier to the second RF-enabled STB, and wherein the initiation command includes a confirmation command.

5. The method of claim 1, wherein the parameter set indicates a content item identifier, a time position in the content item corresponding to a portion of the content item displayed on the first viewing device, and system settings for use by an RF-enabled STB.

6. The method of claim 5, wherein the parameter set includes an offset to the time position.

7. The method of claim 1, wherein the request to map the parameter set to the device identifier is received at the first RF-enabled STB in response to a power off command transmitted from the RF-enabled remote control to the first RF-enabled STB.

8. The method of claim 1, wherein the request to map the parameter set to the device identifier is received in response to a time period cycling.

9. The method of claim 1, wherein the RF-enabled remote control is a smart phone configured to communicate with the first RF-enabled STB and the second RF-enabled STB via an application.

10. A radio frequency (RF) enabled remote control configured for providing a roaming viewing experience, comprising:
    input controls;
    an RF transceiver;
    a processor;
    a memory storage device, including instructions that when executed by the processor enable the RF-enabled remote control to:
       store a device identifier for the RF-enabled remote control in the memory storage device;
       while a content item provided by a first RF-enabled set top box (STB) is being viewed on a first viewing device, transmit the device identifier and a request to the first RF-enabled STB to map a parameter set by which the first RF-enabled STB provides the content item to the device identifier;
       receive, from the first RF-enabled STB, the parameter set mapped to the device identifier for storage in the memory storage device; and
       transmit, via the RF transceiver, the device identifier, the parameter set mapped to the device identifier, and an initiation command to a second RF-enabled STB associated with a second viewing device to instruct the second RF-enabled STB to provide the content item on the second viewing device according to the parameter set mapped to the device identifier.

11. The RF-enabled remote control of claim 10, wherein the RF-enabled remote control is a smart phone configured by application instructions stored in the memory storage device to communicate with STBs.

12. The RF-enabled remote control of claim 10, wherein the request is further configured to delete a mapping between the device identifier and the parameter set a user-configurable number of minutes after the request is received from the RF-enabled remote control.

13. A computer readable storage device including executable instructions which, when executed by a processor, provides a roaming viewing experience in conjunction with radio frequency (RF) enabled remote controls and set top boxes (STB), by:

storing a device identifier in a memory storage device of an RF-enabled remote control;

while a content item provided by a first RF-enabled STB is being viewed on a first viewing device, transmitting the device identifier and a request from the RF-enabled remote control to the first RF-enabled STB to map a parameter set to the device identifier, the parameter set used by the first RF-enabled STB for providing the content item on the first viewing device;

receiving, from the first RF-enabled STB, the parameter set mapped to the device identifier for storage in the memory storage device; and transmitting the device identifier, the parameter set mapped to the device identifier, and an initiation command from the RF-enabled remote control to a second RF-enabled STB associated with a second viewing device, the initiation command instructing the second RF-enabled STB to provide the content item on the second viewing device according to the parameter set mapped to the device identifier.

14. The computer readable storage device of claim 13, wherein the second viewing device is inactive prior to the RF-enabled remote control transmitting the device identifier to the second RF-enabled STB, and wherein the initiation command includes a power on command that includes the device identifier.

15. The computer readable storage device of claim 13, wherein the second RF-enabled STB is providing a second content item on the second viewing device prior to the initiation command being transmitted from the RF-enabled remote control to the second RF-enabled STB, and wherein the initiation command includes a take control command.

16. The computer readable storage device of claim 13, wherein the second RF-enabled STB is providing a second content item on the second viewing device prior to the initiation command being transmitted from the RF-enabled remote control to the second RF-enabled STB, wherein the second RF-enabled STB displays a confirmation pop-up on the second viewing device in response to the RF-enabled remote control transmitting the device identifier to the second RF-enabled STB, and wherein the initiation command includes a confirmation command.

17. The computer readable storage device of claim 13, wherein the parameter set indicates a content item identifier, a time position in the content item corresponding to a portion of the content item displayed on the first viewing device, and system settings for use by an RF-enabled STB.

18. The computer readable storage device of claim 17, wherein the parameter set includes an offset to the time position.

19. The computer readable storage device of claim 13, wherein the request to map the parameter set to the device identifier is received in response to a power off command transmitted from the RF-enabled remote control to the first RF-enabled STB.

20. The computer readable storage device of claim 13, wherein the request to map the parameter set to the device identifier is received in response to a time period cycling.

* * * * *